United States Patent Office 2,820,481
Patented Jan. 21, 1958

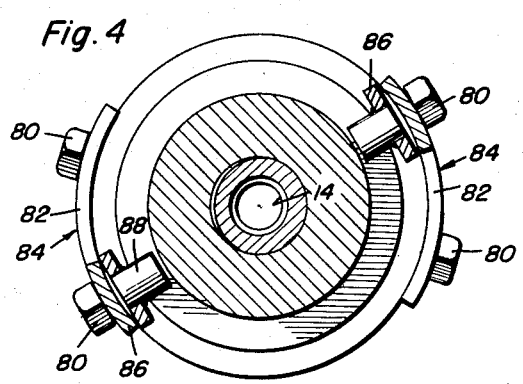
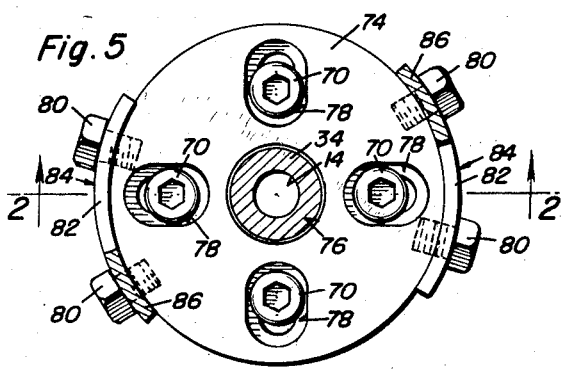
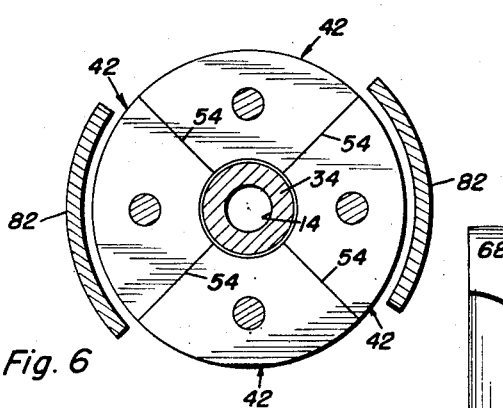
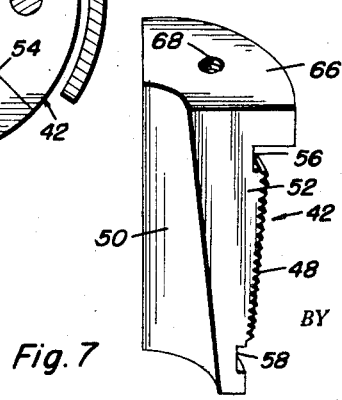
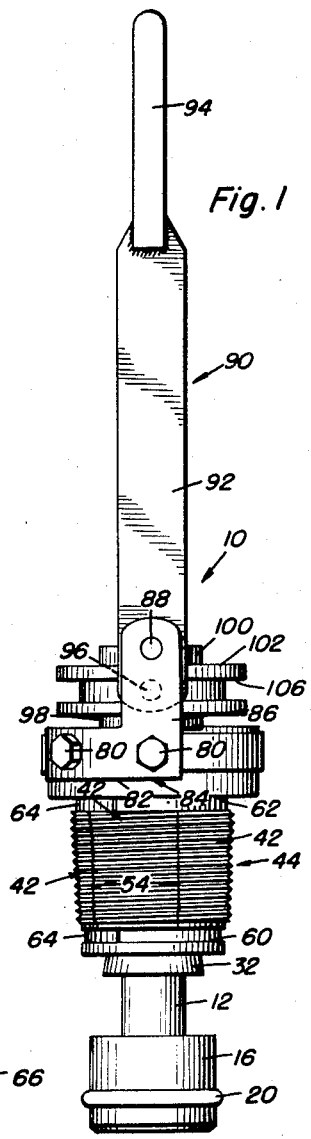

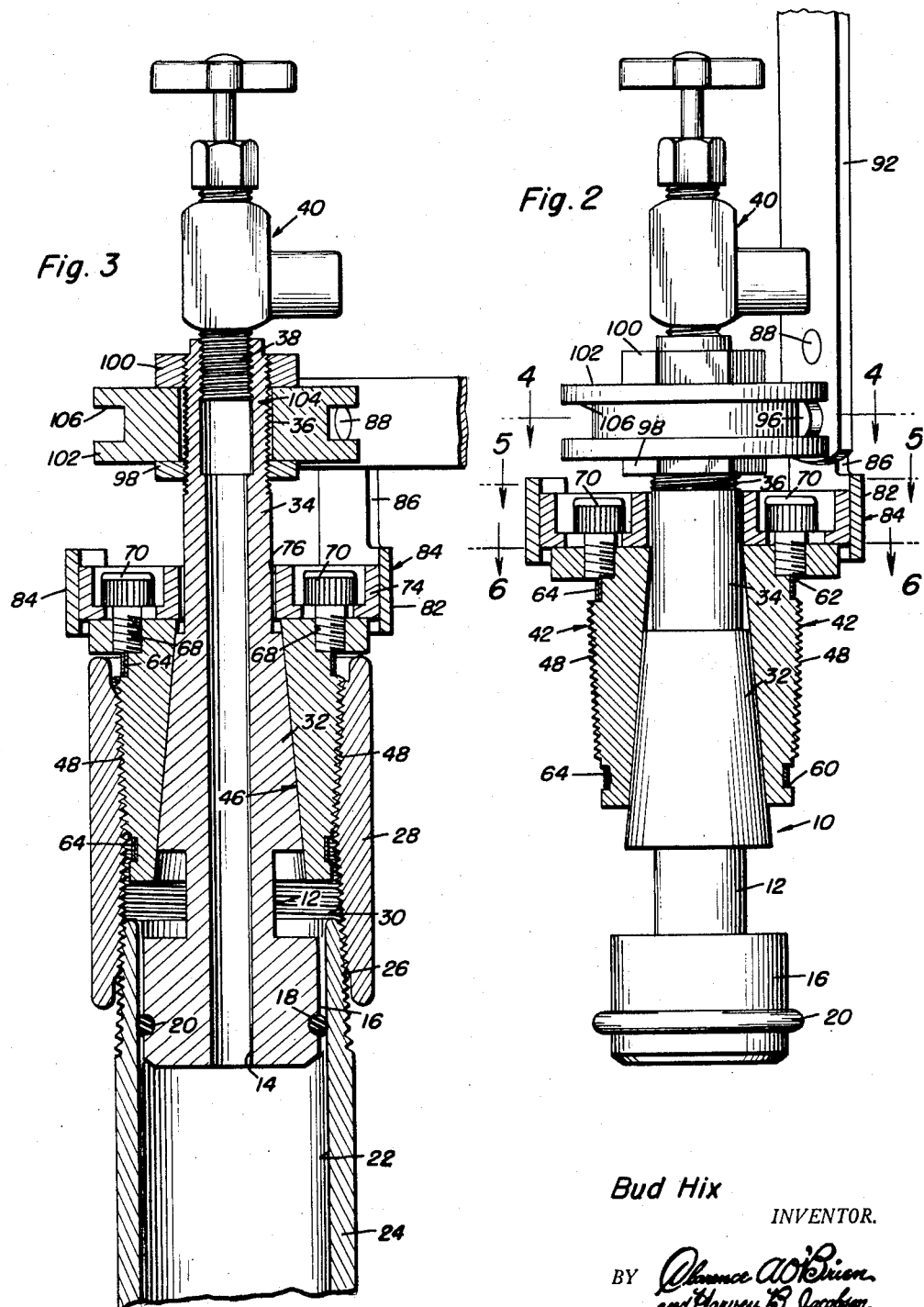

2,820,481
LEVER ACTION PIPE PLUG
Bud Hix, Alice, Tex.

Application August 3, 1955, Serial No. 526,110

3 Claims. (Cl. 138—90)

This invention relates generally to fluid conduit control apparatus and is more particularly concerned with a novel conduit plug assembly which is readily installed and retained in position in conduits containing a fluid such as gas, oil, etc., under pressure whereby valve, vent lines, release lines, pressure gauges, etc., may be incorporated therein for controlling a pressure in the fluid conduit.

A further object of invention in conformance with that set forth above is to provide a fluid conduit plug including a centrally bored mandrel member having a sealing portion engageable with the inner peripheral portion of a fluid conduit, said mandrel member including a plurality of radially extendable slip elements thereon for securing said plug in a relatively fixed position in said fluid conduit and in sealing relationship to the inner peripheral wall of the fluid conduit, and including means permitting the ready insertion and removal of said plug from the fluid conduit.

A still further object of invention in conformance with that set forth is to provide a fluid conduit plug of the character set forth which is readily and economically manufactured, easily installed and maintained, and highly efficient and acceptable for the purpose intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the novel fluid conduit plug;

Figure 2 is an enlarged vertical detail with portions broken away and in section, showing the plug prior to installation in a fluid conduit and having a control valve installed therein;

Figure 3 is a sectional view similar to Figure 2 showing the relative position of the parts of the plug when installed in a fluid conduit;

Figure 4 is a sectional view taken substantially on line 4—4 of Figure 2;

Figure 5 is a sectional view taken substantially on line 5—5 of Figure 2;

Figure 6 is a sectional view taken substantially on line 6—6 of Figure 2; and

Figure 7 is a perspective view of one of the slip elements utilized in retaining the plug within the fluid conduit.

The fluid conduit plug assembly is indicated generally at 10 and includes a central mandrel member 12 which has a central bore portion 14, and having a lower annular sealing portion which includes a circumferential groove portion 18 therearound into which is inserted a suitable sealing element 20 which may be an O-ring or any other suitable sealing member and sealingly engages the inner peripheral wall portion 22 of a fluid conduit 24. The fluid conduit 24 may include an upper threaded portion 26 to which is secured a suitable pipe coupling 28 being secured thereto by means of conventional internal threads 30 by means of which the plug assembly 10 is relatively fixedly secured in sealing relationship with respect to the fluid conduit 24 as will subsequently become apparent. Although the fluid conduit is indicated as having the coupling 28 secured thereon, it is to be understood that the coupling may be eliminated and the conduit 24 may be internally threaded about the upper edge and accordingly the pipe plug may be fixed therein.

The mandrel 12 includes in spaced relation from the annular sealing portion 16 and integral therewith a frusto-conical upwardly extending taper portion 32 which terminates in an upper tubular end portion 34 having external threads 36 and internal threads 38, the internal threads 38 permitting the connection of the plug of a suitable control valve of any conventional nature indicated at 40, or a vent line, release line, pressure gauge, etc.

A plurality of slip elements 42 provide lock means for retaining the plug assembly in a relatively fixed sealing position with the fluid conduit. Although there has been disclosed four cooperating slip elements, it is to be understood that any desirable number such as two, three, etc., may be utilized. The slip elements 42 combine to form a radially extendable segmental cylinder indicated generally at 44, see Figure 1, said cylinder 44 including an inner frusto-conical downwardly opening portion indicated generally at 46, inasmuch as each of the slip elements 42 comprise a segmental cylindrical outer portion 48 and an inner peripheral outwardly tapering arcuate frusto-conical segmental portion 50, the longitudinal sides 52 of said slip elements being engageable at a parting line 54, see Figure 1 for defining the previously mentioned cylinder, each of the slip elements defining a continuous threaded portion which is compatible with the internal threads 30 of the coupling 28 or any internal threads provided in the fluid conduit 24. Thus it will be observed that reciprocal movement between the slip elements 42 and the frusto-conical taper portion 32 of the mandrel results in radial extension of said slip elements into locking engagement with the previously mentioned cooperating threads 30 wherein the plug will be retained in a relatively fixed position when the mandrel is moved upward relative to said slip elements. It will be seen in Figure 2, the slip elements 42 when disposed in the position shown therein define a cross sectional diameter which is less than the maximum cross sectional diameter of the sealing element and the annular sealing portions 16, thus the plug may be readily inserted into the fluid conduit 24, whereafter upward movement of the mandrel results in the radial extension of the slip elements relative to the longitudinal axis of the mandrel with the slip elements being extended beyond the previously mentioned maximum cross sectional diameter and thus the plug is fixedly retained within the fluid conduit, and the sealing element 20 provides a seal between the plug and said conduit.

The slip elements 42 include transverse arcuate upper and lower notch or recess portions 56 and 58, and when all of the slip elements have their edges 52 juxtaposed as seen in Figure 1, there is provided an annular ring 60 and 62 at the lower and upper end portions of said combined slip elements which have circumposed therein a suitable circular split resilient spring 64 which urges the slip elements toward the longitudinal axis of the mandrel 12, or into the position most clearly seen in Figure 2. The slip elements also include integral transverse flange portions 66 which have a vertical tapped bore portion 68 extending therethrough which receives a suitable upwardly extending guide pin 70, which may have an Allen wrench recess in the upper end thereof.

A guide member 74 includes a central aperture portion 76 which loosely retains the guide member of portion 34 of the mandrel, said guide member including a plurality of elongated slot portions 78 guidingly receiving the element 70 of the slip members therein. Reciprocal movement of the mandrel results in the radial or outwardly extending movement of the slip elements with respect to the longitudinal axis of the mandrel, the upper ends thereof being guidedly received in the apertures 78 as just mentioned.

The guide member 74 includes on oppositely disposed portions of the circumferential edge thereof tapped bore portions for receiving fastening elements 80 which secure a lower portion 82 of a pivot bracket 84 in oppositely disposed relationship on said guide member. Said bracket members include upwardly extending diametrically opposed pivot support portions 86 which have suitably secured thereon inwardly directed pivot pins 88.

A lever assembly is indicated generally at 90 and includes a pair of spaced leg members 92 connected by means of a suitable bail or bight portion 94, each of said leg members including an intermediate aperture portion adjacent the lower end thereof, said aperture portions being axially aligned, the aperture portion being pivotally received upon the pivot pins 88 of the previously mentioned brackets, each of the legs including axially aligned mutually directed pivot pin elements 96 the function of which will become subsequently apparent.

The threaded portion 36 of the mandrel includes a pair of spaced adjusting nut elements 98 and 100 thereon for adjustably retaining therebetween in a predetermined adjusted position relative to the brackets 84 adjusting collar or clutch elements 102 which includes a central aperture portion 104 permitting the element 102 to be circumposed upon the threaded portion 36 of said mandrel, said member 102 including an annular recess portion 106 into which the pin elements 96 of the legs 92 of the adjusting lever are slidably received, whereby rotation of the lever assembly 90 about the horizontal axis of the pins 88 of the brackets 84 results in raising or lowering of the mandrel 12 in the previously mentioned securement of the plug within the fluid conduit.

Accordingly, operation of the novel plug is readily apparent, the plug is assembled as seen in Figure 2 whereafter the sealing portion 16 and slip elements are inserted within the conduit and coupling if there is one included, the flange portion 66 of the slip elements being engageable on the upper edge of the coupling, downward movement of the handle assembly 90 results in urging a mandrel upwardly as seen in Figure 3 resulting in the fixed securement of the plug within the fluid coupling and thus controlling the flow of fluid pressure through the same.

Various positional directional terms such as "front," "rear," "top," etc., are utilized herein to have only a relative connotation to aid in describing the device and are not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A conduit plug assembly comprising a pipe coupling attachable to one end of a conduit, a longitudinally bored and movable mandrel extending longitudinally through and out of said coupling and having a tapered intermediate portion within said coupling, a plurality of segmental elongated grips grouped around said intermediate portion and laterally movable outwardly thereby into engagement with said coupling in response to longitudinal movement of said mandrel in the direction of the taper of said tapered portion, an annular guide member for said grips surrounding said mandrel outwardly of said coupling and having corresponding ends of said grips slidably connected thereto for guided lateral movement of said grips, diametrically opposite lateral brackets on said guide member, a lever having a pair of leg portions pivoted on said brackets, a grooved collar fixed on said mandrel between the pivotal axis of said leg portions and said guide member, and pins on said leg portions engaging the groove of said collar whereby pivotal movement of said leg portions will move said mandrel.

2. The combination of claim 1, said grips having transverse grooves therein, and a split resilient ring in said grooves opposing outward lateral movement of said grips.

3. The combination of claim 1, said mandrel having an enlarged cylindrical end extending out of said coupling and provided with a sealing ring therein and adapted for insertion with a sealing fit into a conduit to which the coupling is attached.

References Cited in the file of this patent

UNITED STATES PATENTS

| 1,949,498 | Stone | Mar. 6, 1934 |
| 2,329,801 | Wellborn | Sept. 21, 1943 |
| 2,607,370 | Anderson | Aug. 19, 1952 |
| 2,662,663 | Schmidt et al. | Dec. 15, 1953 |
| 2,670,799 | Dobbs | Mar. 2, 1954 |